Patented Apr. 20, 1954

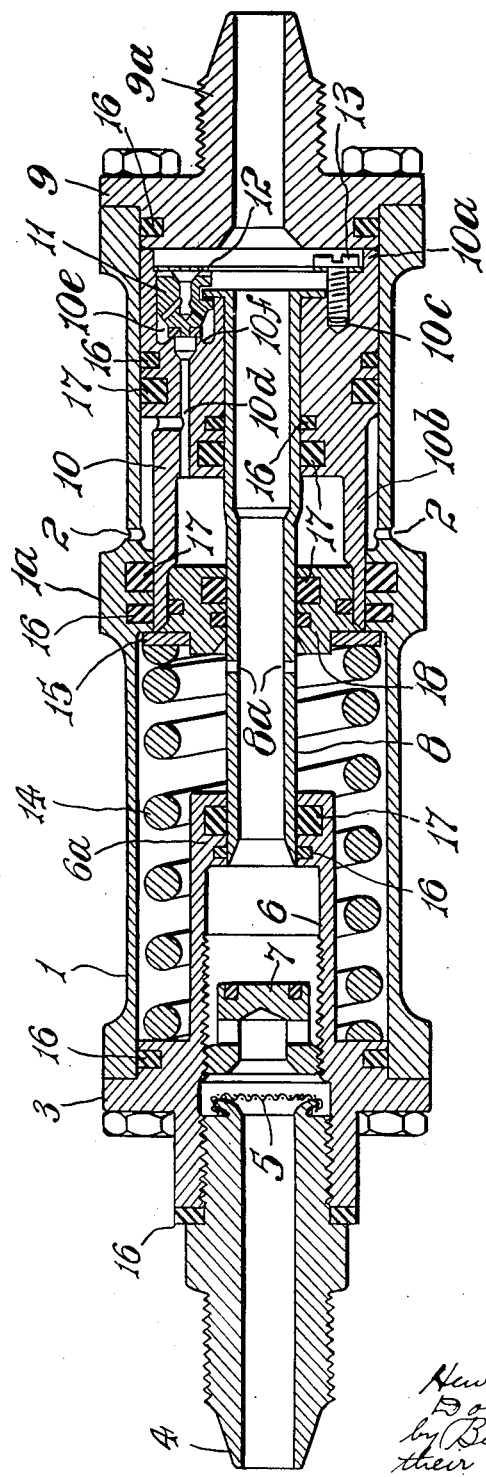

2,675,649

UNITED STATES PATENT OFFICE 2,675,649

PRESSURE REDUCING VALVE

Henry William Trevaskis, Solihull, and Douglas Dewar, Wolston, England, assignors to Dunlop Rubber Company Limited, London, England, a British company Application August 16, 1949, Serial No. 110,512

Claims priority, application Great Britain August 17, 1948

4 Claims. (Cl. 50—35)

This invention relates to an improved pressure reducing valve.

Pressure reducing valves are normally fitted in a fluid pressure system where it is required to reduce the main pressure from the source to operate some mechanism within that system. Such a valve may, for instance, be incorporated within an aircraft pressure system. As an example, the pressure required to operate the jacks that actuate the wing flaps may be considerably less than the pressure required to brake the wheels of the aircraft. In such a case a pressure reducing valve would be incorporated in the pressure line before it reaches the above mentioned jacks.

Types of pressure reducing valves are known which, for instance, operate between a steam boiler and a steam driven mechanism.

In such types the high pressure steam exerts a substantial pressure tending to hold the valve open and it is necessary to provide means to compensate for this pressure in order that the valve may be sensitive to slight pressure fluctuations on the low pressure side. In one such type, the high pressure from the source tends to open a valve to allow the pressure fluid to flow, at the same time opposing such movement by action on a connected piston of the same diameter as the valve. The balance is usually turned by springloaded means which may be so regulated that a predetermined pressure is allowed to build up in the low pressure system before it closes the valve and stops further pressure fluid from passing through.

It is an object of the invention to provide an improved pressure reducing valve in which no substantial pressure is exerted by the pressure fluid on the moveable portion of the valve and compensating means is therefore not required.

It is a further object of the invention to provide an improved pressure reducing valve incorporating automatic means for maintaining the outlet pressure at the desired value irrespective of increase in pressure within the reduced pressure system, caused by, for example, an increase in temperature.

According to the present invention a pressure reducing valve comprises a housing having at one end a high pressure chamber adapted to be connected to a source of fluid pressure and at the other end a low pressure chamber adapted to be connected to a fluid pressure operated device, a spring controlled piston within the said low pressure chamber having an extension passing into the said high pressure chamber, the said piston and extension having a central hole therethrough leading from the high pressure chamber to the low pressure chamber, and the extremity of the said extension being adapted to co-act with a valve seating in the said high pressure chamber to close the opening therethrough whereby excess pressure in the low pressure chamber actuates the piston against the springload and causes the piston extension to close the supply of pressure fluid to the low pressure chamber.

In a preferred form of the invention the pressure reducing valve incorporates a relief valve, whereby pressure in the low pressure system in excess of a predetermined value may flow to exhaust.

One embodiment of a pressure reducing valve, which incorporates a relief valve, in accordance with the invention will now be described with reference to the accompanying drawing, which shows a section of the valve on a diametral plane.

The valve comprises a cylindrical housing 1 having at each end a squared flange provided with a threaded hole in each corner thereof. Small holes 2 are provided in the wall of the housing at a position approximately mid-way its length.

One end of the housing is closed by a flanged member 3 which is fixed thereto by screws engaging the threaded holes mentioned above. A connector 4 engages in a tapped hole in the member and is provided with a filter 5 which is sprung on to an annular projection on the inner end of the connector. Integral with the flanged member is a cylindrical chamber 6 having a threaded internal portion to receive an externally threaded seating 7 for a tube 8 which forms a slidable extension of a piston 10 and which is slidable in the reduced diameter portion 6a of the projection 6. Communication between the inside and outside of the tube is provided by small holes 8a.

The other end of the housing is closed by a flanged disc 9 having a connector 9a integral therewith.

The piston 10 has a central aperture and is slidably fitted within said housing and is provided with a skirt at each end. One skirt, 10a has a diameter equal to the internal diameter of the housing and is adapted to abut the disc 9. The other skirt 10b, which has a diameter less than that of the piston, is received in a reduced diameter portion 1a of the housing and forms with the housing a narrow annular chamber communicating with the holes 2 in the housing and with a passage 10d in the piston. A plug 18 is fitted in the end of the skirt 10b and has a central aperture which together with the central aperture in the piston forms a guide for the tube 8.

The face of the piston nearest the disc 9 contains two diametrically opposite axially aligned holes 10c, 10e of different diameters. One hole 10c, which extends only a short distance into the piston, is threaded. The other larger hole 10e communicates through the passage 10d with the annular chamber and so with the holes 2. An annular lip 10f near the entrance of the hole forms a seating for a relief valve member 11.

This member is slidably fitted within the hole 10e and has a rubber washer fitted in a recess at one end adapted to seat against the lip 10f. The outer face of the valve member is provided centrally with a hole extending into the member and terminating in four holes at an angle thereto, whereby pressure fluid may flow down the central hole, out of the holes at an angle thereto and into the passage 10d. The valve member has a segmental slot extending transversely across its periphery and is so positioned in the hole in the piston that the slot engages on the outwardly extending lip of the tube 2, whereby the valve member is maintained in a fixed position relative to said tube.

The outer face of the valve member is provided with two slots, each extending across the diameter of the face at right angles to one another, and the valve member is pressed against the valve seat by an annular washer-like spring 12 retained in position on the face of the piston by a screw 13 passing through the spring and into the threaded hole 10c in the face of the piston.

The piston is urged towards the disc 9 by a coil spring 14 located between the inner face of the member 3 and an annular plate 15 which bears on the end of the lesser diameter skirt of the piston.

Sealing rings 16 are provided where required to give leakproof joints and lubricating rings 17 are also provided where relative movement between contacting faces occurs.

In action the valve operates as follows. High pressure fluid enters the reducing valve through the inlet nozzle 4 and passes through the cylindrical chamber, the tube 8 and the outlet nozzle 9a into the system. It also passes through the holes 8a into the space surrounding the spring 14. The pressure per unit area is thus the same on each transverse face of the piston but the area of the face at the outlet nozzle end exceeds that of the face at the spring loaded end by such an amount that the total pressure tending to force the piston and tube back to cut off the flow of pressure fluid is greater than the sum of the reverse fluid pressure and the spring load. At a predetermined pressure therefore, which will depend on various factors including the strength of the spring and the position of the seating in the chamber 6, the tube 8 will contact with the seating 7 and cut off the flow of pressure fluid. If the pressure in the system drops the pressure of the spring 14 on the reverse face of the piston overcomes the pressure at the low pressure end and pushes the piston and tube forward again, thus permitting pressure fluid to flow into the system until the pressure is built up to the desired value.

It may so happen that the pressure in the system, having reached the desired value, is further increased by the heat which such pressure will generate. This excess pressure, acting against the spring, will force the piston back. It cannot force the tube back since it is already seated on the valve seat in the cylindrical chamber. The valve member 11 fitted within the piston and held by the lip of the tube also cannot move. Backward movement of the piston carrying with it the valve seating 10f will therefore open the valve 11, allowing pressure fluid to flow into the passage 10d and thence to the atmosphere through the annular space and the holes 2. When the pressure in the system has returned to the desired value the pressure of the spring will force the piston forward, thereby seating the small valve once more and preventing the further escape of pressure fluid.

Outlet pressure may be adjusted and a limited range of pressures obtained by adjusting the position of the seating in the cylindrical chamber relative to the tapered end of the tube, whilst a whole range of pressures may be obtained by fitting differently rated coil spring to the pressure reducing valve.

Having described our invention what we claim is:

1. A pressure regulating valve comprising a housing having a high pressure chamber, a low pressure chamber and an intermediate chamber between said high pressure chamber and said low pressure chamber, a valve seat in said high pressure chamber, a piston in said low pressure chamber having an extension of reduced diameter extending into said intermediate chamber, an open ended tube mounted on and movable with said piston and extending from said low pressure chamber into said high pressure chamber in position to seat on and be closed by said valve seat, said tube having openings into said intermediate chamber, and a spring reacting on said piston to move it in a direction to withdraw said tube from said valve seat.

2. The pressure regulating valve of claim 1 in which said piston is slidable relative to said tube when said tube is seated on said valve seat and is provided with a relief valve seat, a relief valve secured to said tube to seat on said relief valve seat and to move to open position upon movement of said piston toward said high pressure chamber relative to said tube, and a spring to press said relief valve to closing position.

3. The pressure regulating valve of claim 1 in which said housing has a relief opening between said low pressure chamber and said intermediate chamber and in which said piston has a relief valve port communicating with said relief opening, a valve seating on said relief valve port and secured to said tube, said tube being slidable relative to said piston and a spring on said piston pressing said relief valve on said relief valve port and permitting said relief valve to open said relief port when said tube is seated on said valve seat and said piston is moved relatively to said tube toward said high pressure chamber.

4. A pressure regulating valve comprising a housing, a high pressure chamber at one end of the housing provided with means for connecting it to a source of fluid pressure, a valve seat within said chamber, a piston at the other end of said housing forming with said end a low pressure chamber provided with means for connecting it to a fluid pressure operated device, a second piston of reduced diameter connected to the first piston and making a fluid-tight seat with the wall of the housing and forming with the housing a pressure-tight chamber on the input side of the second piston and an atmospheric pressure chamber at the output side, a tube associated with the first piston and extending through both pistons into the high pressure chamber to connect said chamber with the low pressure chamber, said tube being adapted to seat on the valve seat in the high pressure chamber and having an orifice in its wall to allow the flow of fluid therefrom into said pressure-tight chamber, and a spring in said chamber urging said piston and tube towards the low pressure end of the housing.

References Cited in the file of this patent

UNITED STATES PATENTS

| Number | Name | Date |
|---|---|---|
| 310,605 | Millner | Jan. 13, 1885 |
| 334,326 | Acheson | Jan. 12, 1886 |
| 444,082 | Abbe | Jan. 6, 1891 |
| 527,902 | Taafel | Oct. 23, 1894 |
| 614,441 | Burnett | Nov. 22, 1895 |
| 1,593,648 | Berger | July 27, 1926 |
| 1,725,539 | Riley | Aug. 20, 1929 |
| 2,254,253 | Williams | Sept. 2, 1941 |
| 2,529,731 | Hollerith | Nov. 14, 1950 |

FOREIGN PATENTS

| Number | Country | Date |
|---|---|---|
| 34,017 | Norway | Jan. 30, 1922 |